United States Patent
Matsushima et al.

(10) Patent No.: US 7,617,746 B2
(45) Date of Patent: *Nov. 17, 2009

(54) SHIFT LEVER APPARATUS

(75) Inventors: Isamu Matsushima, Aichi (JP); Kenichi Kako, Aichi (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 810 days.

This patent is subject to a terminal disclaimer.

(21) Appl. No.: 11/033,963

(22) Filed: Jan. 13, 2005

(65) Prior Publication Data

US 2005/0160860 A1 Jul. 28, 2005

(30) Foreign Application Priority Data

Jan. 14, 2004 (JP) .............................. 2004-006807

(51) Int. Cl.
*B60K 20/00* (2006.01)

(52) U.S. Cl. ...................................... 74/473.1

(58) Field of Classification Search ................ 74/473.1, 74/473.3, 473.34, 473.36, 473.37, 519, 523, 74/524, 526

See application file for complete search history.

(56) References Cited

U.S. PATENT DOCUMENTS 5,445,046 A * 8/1995 Kataumi et al. ............... 74/527
5,622,079 A * 4/1997 Woeste et al. ................. 74/335
6,386,061 B1 * 5/2002 Giefer ...................... 74/473.18
6,662,678 B2 * 12/2003 Tomida ........................ 74/523

FOREIGN PATENT DOCUMENTS

| JP | 56-30605 U | 3/1981 |
| JP | 2001-1781 A | 1/2001 |
| JP | 2001-030789 | 2/2001 |
| JP | 2002-120582 A | 4/2002 |

OTHER PUBLICATIONS

Office Action dated Jul. 28, 2009 issued by the Japanese Patent Office in corresponding Japanese Patent Application No. 2004-006807.

* cited by examiner

*Primary Examiner*—Vicky A Johnson
(74) *Attorney, Agent, or Firm*—Roberts Mlotkowski Safran & Cole, P.C.; Thomas W. Cole

(57) ABSTRACT

A shift lever apparatus including a shift lever assembly, which is supported by a shaft that is disposed along the transverse direction of a vehicle, the lever assembly being operable in the longitudinal and the transverse directions of the vehicle, the apparatus including: a connection pin which is temporarily assembled when inserted along an axis thereof from one end of the shift lever assembly and the shaft into the lever assembly and the shaft, the connection pin becoming regularly assembled when rotated about the axis thereof from the temporarily assembled state, and which supports the lever assembly to be pivotable on the shaft in the transverse direction of the vehicle; and a fallout-preventing mechanism which is provided on the lever assembly to be engageable with the connection pin, and which prevents the connection pin from falling out from the lever assembly and the shaft by engaging the connection pin.

16 Claims, 6 Drawing Sheets

SHIFT LEVER APPARATUS

CROSS-REFERENCE TO RELATED APPLICATION

This application claims priority under 35 USC 119 from Japanese Patent Application No. 2004-006807, the disclosure of which is incorporated by reference herein.

BACKGROUND OF THE INVENTION

1. Field of the Invention

The present invention relates to a shift lever apparatus for changing a shift position when a shift lever is moved.

2. Description of the Related Art

A shift lever apparatus for shifting a transmission mounted on a vehicle such as an automobile is supported, by way of example, at a lower end thereof by a cylindrical shaft that is arranged in parallel with the left-right (transverse) direction of the vehicle so that the apparatus may be operated in a shift direction (i.e. a front-rear direction of the vehicle). An example in which the lower end of such a shift lever apparatus is supported by a shaft is disclosed in Japanese Patent Application Laid-Open (JP-A) No. 2001-30789.

According to the invention disclosed in JP-A No. 2001-30789, a pin-stopper hole is provided in the shaft which is rotatable in the shift direction, and a retaining member for preventing a pin from falling out from the pin-stopper hole is provided in the vicinity of the pin-stopper hole. The retaining member restrains the pin head from the side of an insertion direction of the pin. When the pin is inserted into the pin-stopper hole to a position where the pin can connect the lower end of the shift lever with the shaft, the retaining member restrains the pin head from the insertion direction side thereof in order to restrict the pin from moving in the insertion direction. Hence, the pin is prevented from falling out of the pin-stopper hole.

However, the shift lever apparatus of this type has a disadvantage such that assembling of the lower end of the shift lever with the shaft becomes troublesome because of the increase in the number of components required for the assembling thereof. Such a disadvantage is observed significantly, in particular, in the type of shift lever apparatus in which a shift lever is assembled with a shaft after being mounted in a housing.

SUMMARY OF THE INVENTION

In view of the aforementioned, an object of the present invention is to provide a shift lever apparatus that may reduce the number of components and that can be easily assembled with the shaft.

A first aspect of the present invention is to provide a shift lever apparatus including a shift lever assembly, the shift lever assembly being supported by a shaft that is disposed along the transverse direction of a vehicle, the lever assembly being operable in the longitudinal direction of the vehicle and the transverse direction of the vehicle, the shift lever apparatus comprising: a connection pin which is temporarily assembled when inserted along an axis thereof from one end of the shift lever assembly and the shaft into the lever assembly and the shaft, the connection pin becoming regularly assembled when rotated about the axis thereof from the temporarily assembled state, and which supports the lever assembly to be pivotable on the shaft in the transverse direction of the vehicle; and a fallout-preventing mechanism which is provided on the lever assembly to be engageable with the connection pin, and which prevents the connection pin from falling out from the lever assembly and the shaft by engaging the connection pin while the connection pin is in the regularly assembled state.

According to the shift lever apparatus having the above-described structure, when assembling the shift lever assembly with the shaft which is disposed along the left-right (transverse) direction of the vehicle, firstly, the shift lever assembly is placed in the position where the shift lever assembly is to be assembled with the shaft. Then, the connection pin is inserted through the shift lever assembly and the shaft along the direction of the axis of the pin itself, and is fixed temporarily.

Then, by rotating the connection pin about the axis of the pin from the temporarily assembled state, the connection pin is put into the regularly assembled state. As a result, the shift lever assembly is supported by the connection pin to be rotatable on the shaft in the left-right direction of the vehicle.

In the state in which the connection pin is regularly assembled, when the connection pin moves in the direction opposite to the insertion direction (i.e. the direction in which the connection pin falls out from the shift lever assembly and the shaft), the connection pin engages with the fallout-preventing mechanism, which is provided in the shift lever assembly, and is prevented from falling out from the shift lever assembly and the shaft.

Furthermore, in the present invention, in order to assemble the shift lever assembly to the shaft, it is sufficient only to rotate the connection pin about the axis thereof after inserting the connection pin through both of the shift lever assembly and the shaft. Hence, the invention permits the shift lever apparatus to be readily assembled to the shaft.

In the first aspect, the connection pin may include a stem which is formed in the shape of a bar and inserted into both the shaft and the lever assembly and a head portion which projects radially outward from one end of the stem and is formed integrally with the stem, and the fallout-preventing mechanism may be formed integrally with the lever assembly, and serve as a stopper for preventing the connection pin from falling out by abutting the head portion of the connection pin when the connection pin is in the regularly assembled state.

According to the above-described shift lever apparatus, the connection pin includes a stem, which is formed in a bar shape. The stem of the connection pin is inserted into both of the shift lever assembly and the shaft, and supports the shift lever assembly to be pivotable on the shaft in the left-right direction of the vehicle. Further, this connection pin includes a head portion which projects outward from one end of the stem in the radial direction thereof and is formed integrally with the stem. As described above, the head portion of the connection pin is rotated about the axis thereof (i.e. about the axis of the stem) so as to be put in the regularly assembled state from the temporarily assembled state.

In addition, the fallout-preventing mechanism is formed integrally with the shift lever assembly. The fallout-preventing mechanism prevents the connection pin from falling out by abutting the head portion of the connection pin when the connection pin, which is in the regularly assembled state, moves toward the direction opposite to the insertion direction.

As described above, the fallout-preventing mechanism is formed integrally with the shift lever assembly. Accordingly, the connection pin may be prevented from falling out without any members for restricting the connection pin from moving in the direction of the axis thereof. Hence, the present invention can suppress the number of the components for assembling the shift lever apparatus.

In the first aspect, the shift lever apparatus may further comprise a reverse-rotation preventing member, which is formed integrally with the lever assembly in a path of rotation taken by the connection pin from the temporarily assembled state to the regularly assembled state, and serves to prevent the connection pin from rotating in reverse from the regularly assembled state to the temporarily assembled state by abutting the connection pin when in the regularly assembled state.

According to the above-described shift lever apparatus, once the connection pin has been put into the regularly assembled state, even if the connection pin tends to rotate in reverse from the regularly assembled state to the temporarily assembled state (i.e. returns from the regularly assembled state to the temporarily assembled state), the connection pin abuts (i.e. is pressed down by) the reverse-rotation preventing member which is formed integrally with the lever assembly in the path of rotation from the temporarily assembled state to the regularly assembled state and is prevented from rotating in reverse. Thus, this is more preferable, since the regularly assembled state of the connection pin is maintained, and the connection pin cannot return inadvertently to the temporarily assembled state and fall out.

As described above, the reverse-rotation preventing member is formed integrally with the shift lever assembly. Accordingly, the connection pin can maintain the regularly assembled state without any members for restricting the connection pin from rotating about the axis thereof. Hence, the present invention can further suppress the number of the components for assembling the shift lever apparatus.

In the first aspect the shift lever apparatus may further comprise a rattling-preventing member, which is formed integrally with and projects from the shift lever assembly for contacting with the connection pin when in the regularly assembled state, and which serves to prevent the connection pin from moving in the axial direction thereof in the regularly assembled state.

According to the above-described structure, when the connection pin is rotated until the regularly assembled state is achieved, the connection pin is prevented from falling out.

Further, in the case in which the connection pin is set to the regularly assembled state, the connection pin is prevented from moving in the axial direction thereof by a rattling-preventing member, which is formed integrally with and projects from the shift lever assembly so as to correspond to the connection pin, which is in the regularly assembled state. Hence, this is more preferable since the connection pin is further prevented from rattling in the axial direction thereof when the shaft and the shift lever assembly are assembled together.

In addition, when the lever assembly is assembled to the shaft by also utilizing the above-described reverse-rotation preventing member, the rattling in the direction about the axis of the connection pin can be suppressed due to the frictional force generated between the connection pin and the rattling-preventing-member, and therefore this is more prefereable.

As described above, the rattling-preventing member is formed integrally with the shift lever assembly. Accordingly, rattling of the connection pin can be prevented without any additional members for preventing the connection pin from rattling. Hence, the present invention can further suppress the number of components for assembling the shift lever apparatus.

A second aspect of the present invention is to provide a shift lever apparatus being mounted on a vehicle and including a shift lever assembly, the shift lever assembly being supported by a shaft that is disposed along the transverse direction of the vehicle, the lever assembly being operable in the longitudinal direction and the transverse direction of the vehicle, the shift lever apparatus comprising: two leg pieces being spaced apart and opposite to each other, one of the leg pieces having a bearing hole and the other of the leg pieces having an insertion hole; a connection member including a stem and a head having longitudinal side surfaces and transverse side surfaces, which connects the shift lever assembly with the shaft when the stem is passed through the insertion hole and into the bearing hole of the leg pieces; a fallout-preventing mechanism provided opposite to the other of the leg pieces, which prevents the connection member from moving in the axial direction thereof; a first retaining piece, one end of which being fixed in a cantilever configuration on the other one of the leg pieces and disposed along the vertical direction of the vehicle; and a second retaining piece which is spaced apart from the first retaining piece and provided integrally with the other one of the leg pieces; wherein the connection member is put into a regularly assembled state when rotated about the axis of the stem in one direction, thereby being removed from the temporarily assembled state where the connection member is inserted from the insertion hole via the shaft up to the bearing hole, the shift lever assembly being supported by the shaft to be rotatable in the transverse direction of the vehicle.

In the second aspect the shift lever apparatus may further comprise an engaging projection, the engaging projection being attached to the fallout-preventing mechanism.

A third aspect of the present invention is to provide a method for assembling the shift lever apparatus according to the invention, comprising: arranging the shift lever assembly such that the shaft is located between the two leg pieces; putting the connection member in the temporarily assembled state by inserting the stem of the connection member from the insertion hole in the other of the leg pieces, through the shaft, and into the bearing hole in the one of the leg pieces; and rotating the head of the connection member about the axis thereof in the one direction from the temporarily assembled state to the regularly assembled state to assemble the shift lever assembly with the shaft.

DETAILED DESCRIPTION OF THE INVENTION

Figure 1:
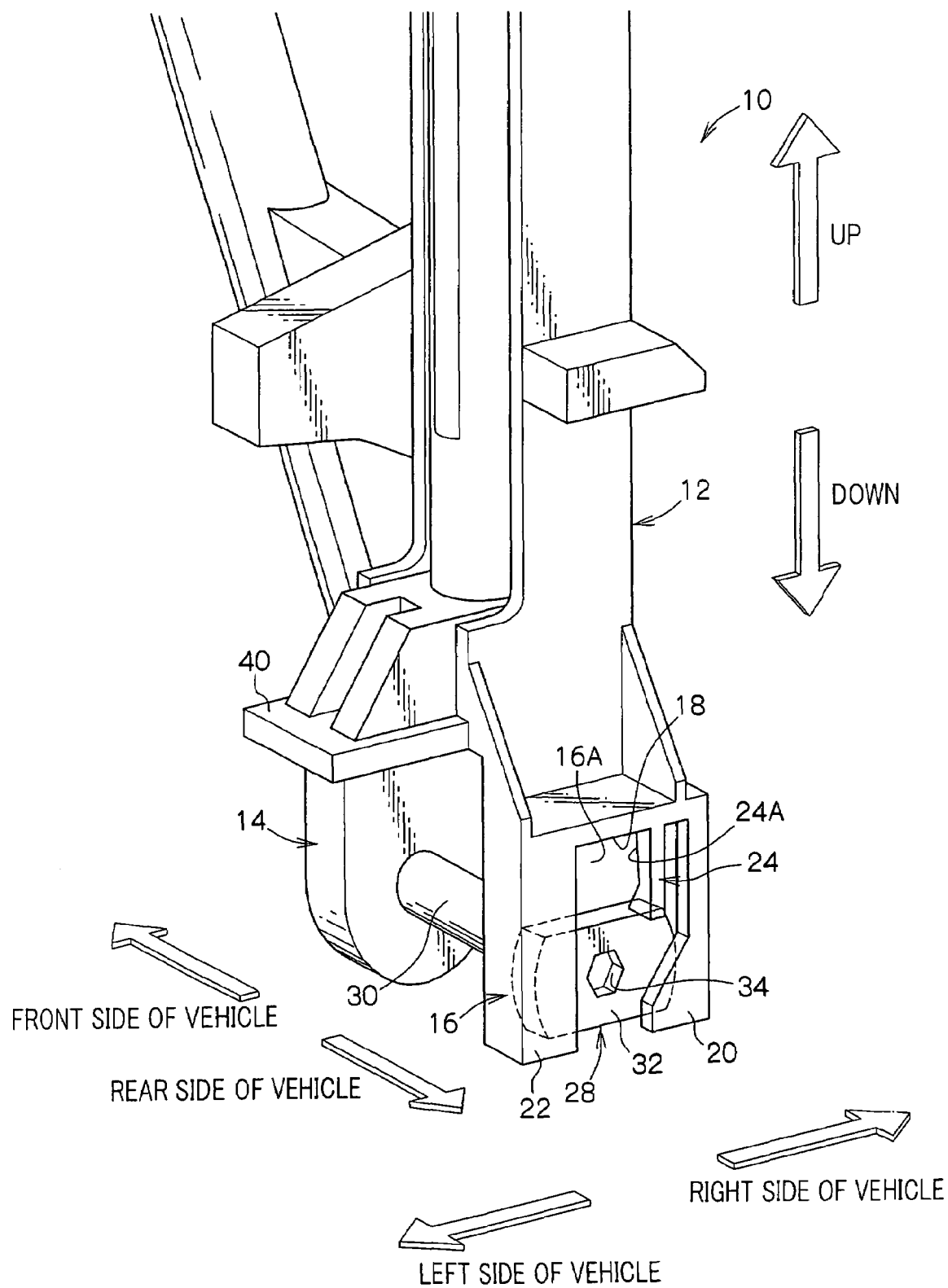
FIG. 1 is a schematic perspective view of a lower end of a shift lever assembly in a shift lever apparatus according to an embodiment of the present invention, showing a regularly assembled state of a connection pin.

FIG. 1 schematically shows a shift lever apparatus 10 according to an embodiment of the present invention.

A substantially plate-like bottom wall 40 is formed at a lower end of a shift lever assembly 12, which is provided in a shift lever apparatus 10. A thickness direction of the bottom wall 40 corresponds to a vertical direction of the vehicle. A pair of leg pieces 14, 16, which are substantially in a shape of a plate with a thick thickness, extend downwardly from the bottom wall 40 opposing each other. Viewed from the direction orthogonal to the direction in which the leg pieces 14 and 16 oppose each other, the bottom wall 40 and the leg pieces 14, 16 are integrally formed into a substantial U-shape. The dimensions of the space defined between the leg piece 14 and the leg piece 16 (i.e., the dimension in the vertical direction and the dimension in the direction in which the leg pieces 14 and 16 oppose each other) are, for example, adapted to correspond to the size of the cylindrical shaft 36, which is disposed along the left-right (transverse) direction of the vehicle (see FIGS. 3, 4 and 6), so that the shaft 36 can be inserted and arranged within this space. The shaft 36 is provided with a connection pin insertion hole 36A, which is formed so as to penetrate through the shaft in a radial direction thereof, for inserting therein a connection pin, which will be described later. Hereinafter, in the present embodiment, for convenience of explanation, the shaft 36 is disposed along the left-right (transverse) direction of the vehicle and is freely rotatable about the axis of the shaft itself, the leg pieces 14 and 16 are disposed at the front side and the rear side of the vehicle respectively, and the direction in which the leg pieces 14 and 16 oppose each other is parallel to the front-rear (longitudinal) direction of the vehicle.

Figure 2:
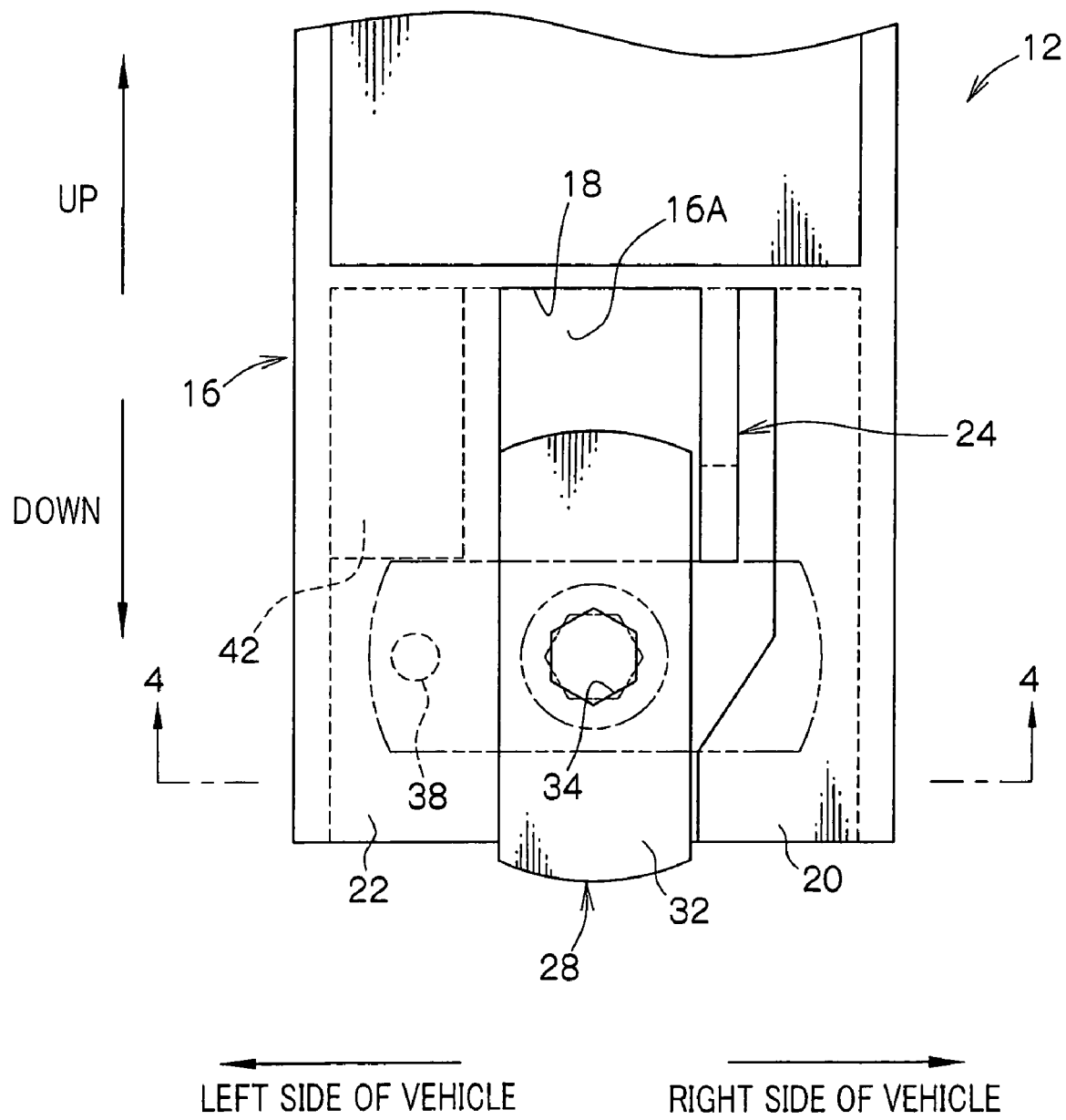
FIG. 2 is a schematic front view of a leg piece of the shift lever assembly, the leg piece engaging and holding a head portion of the connection pin of FIG. 1.

In FIG. 2, there is shown a front view of the leg piece 16 viewed from the rear side of the vehicle. The leg piece 16 is formed of resin having some amount of elasticity. As shown in FIG. 2, a vehicle front side of the leg piece 16 (i.e., the leg piece 14 side of the leg piece 16) is closed by an inner wall 16A. Further, at a vehicle rear side of the leg piece 16 (i.e., the side opposite from the leg piece 14 side), substantially plate-like stoppers 20, 22 serving as a fallout-preventing mechanism are formed integrally with the leg piece 16 at a vehicle right side end portion and a vehicle left side end portion of the leg piece 16 and extend along the vertical direction. Viewed from the rear side of the vehicle, a substantially rectangular cutout 18, which extends in the vertical direction, is formed between the stoppers 20, 22.

Further, at the vehicle rear side of the leg piece 16, a retaining piece 24 (i.e., a first retaining piece) serving as a reverse-rotation preventing member is formed at the right side of the center in the vehicle transverse direction and is spaced apart from the stopper 20 to some extent and extend downwardly from the upper end of the cutout 18. The lower end of the retaining piece 24 is positioned in the substantial center portion of the leg piece 16 in the vertical direction. The base end portion of the retaining piece 24 (i.e., the upper end of the retaining piece 24) is a fixed end which is integrally formed with the upper end of the leg piece 16. Further, the distal end portion of the retaining piece 24 (i.e., the lower end of the retaining piece 24) is a free end.

Figure 3:
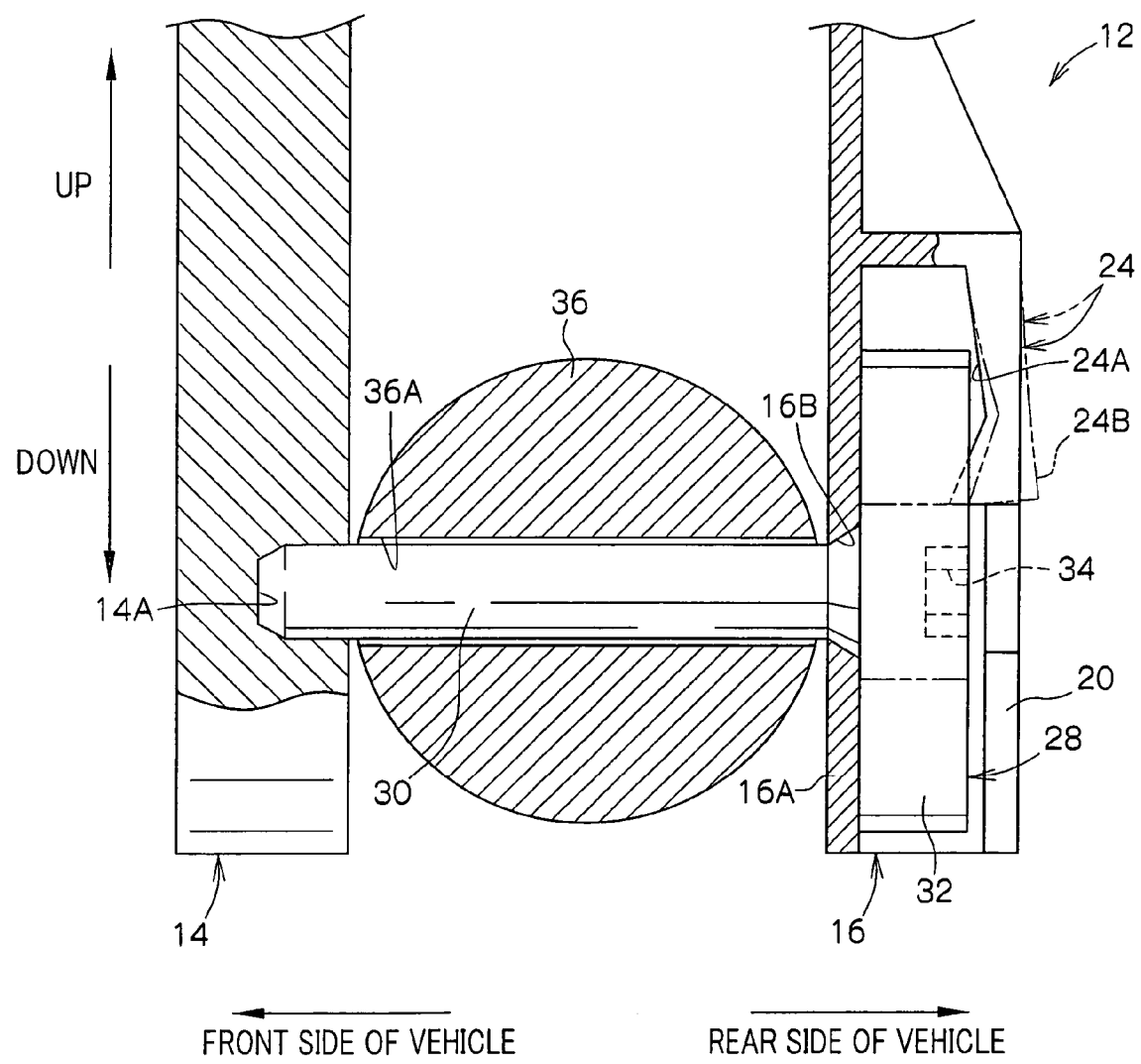
FIG. 3 is a schematic cross-sectional side view of the lower end of the shift lever assembly of FIG. 2.

As shown in FIG. 3, viewing the leg pieces 14 and 16 from the left side of the vehicle, a guide surface 24A, which abuts a head portion 32 of the connection pin 28 (described later) when the pin 28 rotates, is formed at the vehicle front side of the retaining piece 24. The guide surface 24A is formed so as to be basically sunken further towards the vehicle rear side than the head portion 32 of the connection pin 28. However, in a natural condition, the lower end of the guide surface 24A projects further toward the vehicle front side than the outer side of the head portion 32 of the connection pin 28 (i.e., the end surface of the head portion at the vehicle rear side). Note that, in the present embodiment, the guide surface 24A, seen from the vehicle left-right direction, is formed in a shape like an angled bracket "<", which is formed by joining two inclined planes having different angles of inclination with respect to the vertical direction of the vehicle. Alternatively, the guide surface 24 may be shaped like a recess having a curved surface, which projects toward the vehicle rear side.

Figure 4:
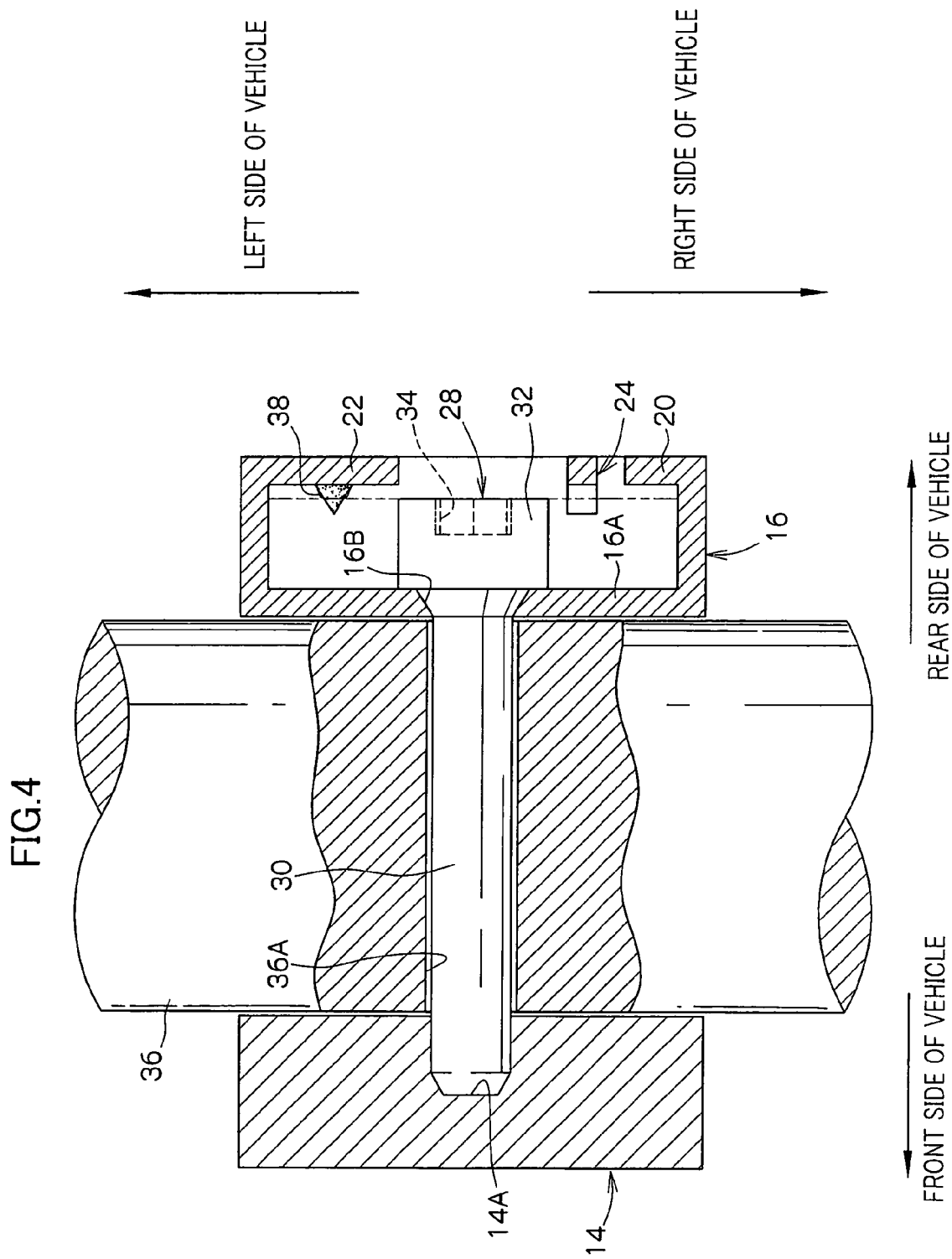
FIG. 4 is a cross-sectional view showing the shift lever assembly of FIG. 3 from a bottom side thereof, in which the head portion of the connection pin is in a temporarily fixed state.
Figure 5:
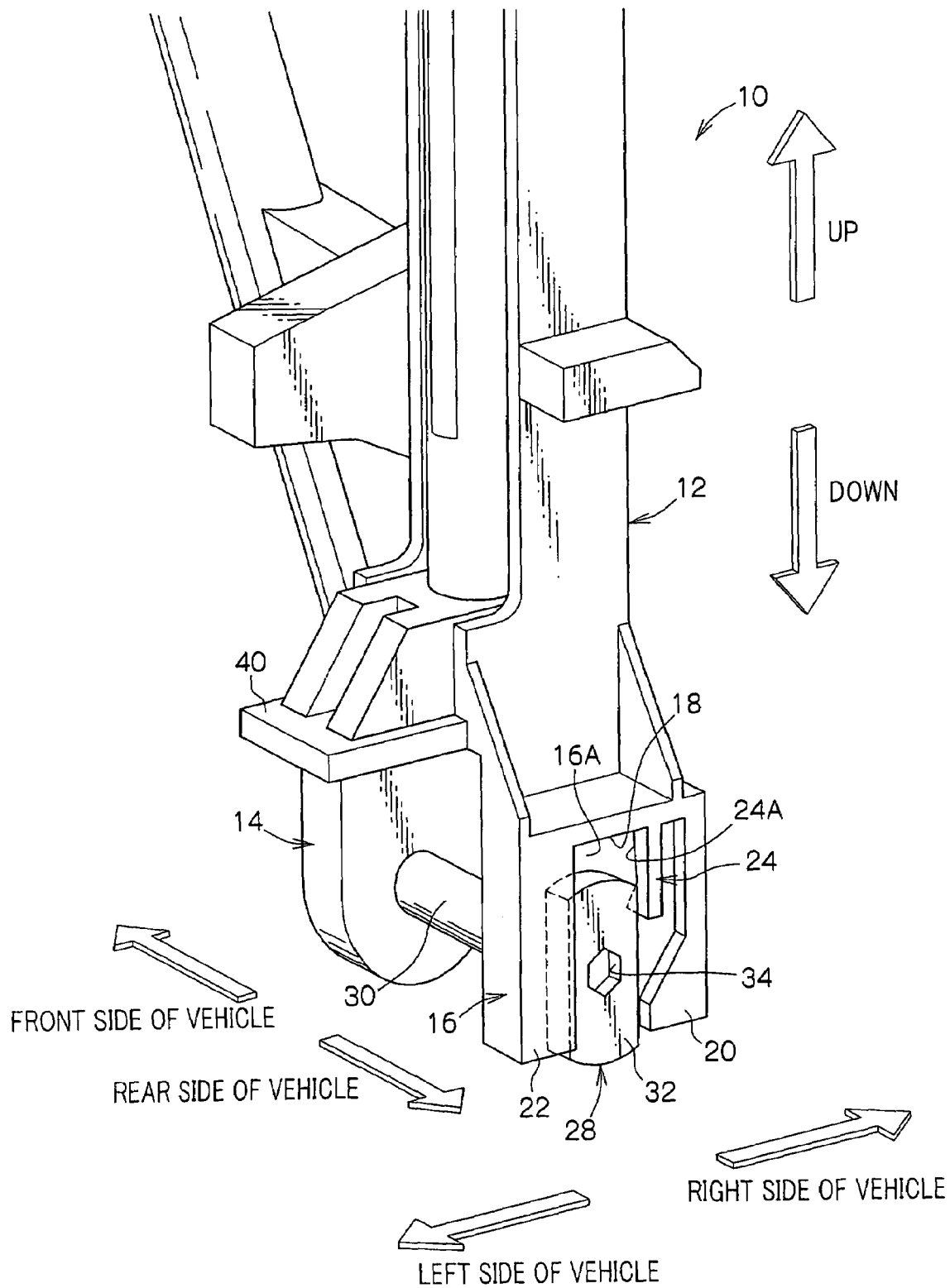
FIG. 5 is a schematic perspective view of the lower end of the shift lever assembly of FIG. 4, in which the head portion of the connection pin is in a temporarily fixed state.

Moreover, a conical depressing rib 38, which serves as a rattling-preventing member or an engaging protrusion, is integrally formed at the stopper 22 of the leg piece 16 at the vehicle front side thereof (inner wall 16A side) and projects toward the vehicle front side (see FIGS. 2 and 4). This depressing rib 38 is disposed to abut the head portion 32 of the connection pin 28, which is in the state such that the longitudinal direction thereof is parallel with the left-right direction of the vehicle (i.e., the regularly assembled state as will be described later). The depressing rib 38 is formed so that the axis thereof is parallel with the front-rear direction of the vehicle. The apex of the depressing rib 38 is positioned further toward the front side of the vehicle than the outer surface of the head portion 32 of the connection pin 28 (i.e., the surface on the vehicle rear side).

Further, between the stopper 22 of the leg piece 16 and the inner wall 16A, a rectangular parallelepiped retaining piece 42 (i.e., a second retaining piece) is formed integrally with the stopper 22 and the inner wall 16A (see FIG. 2). Seen from the rear side of the vehicle, the retaining piece 42 is completely concealed behind the rear side of the stopper 22 (i.e., the vehicle front side of the stopper). The lower end of the retaining piece 42 is disposed at substantially the same position in the vertical direction as that of the lower end of the above-described retaining piece 24 (i.e., the free end), and is positioned at the substantial center of the leg piece 16 in the vertical direction. The lower end of the retaining piece 42 corresponds to the end portion of the head portion 32 of the connection pin 28 in the longitudinal direction, and in the case where the longitudinal direction of the head portion 32 becomes parallel with the vehicle left-right direction, the retaining piece 42 is abutted from below by the longitudinal end portion of the head portion 32. Accordingly, the retaining piece 42 restricts the head portion 32 from making a clockwise rotation (i.e., clockwise rotation about the axis of the stem 30 of the connection pin 28, as will be described later, seen from the rear side of the vehicle). Note that, the retaining piece 42 may be adapted to correspond the lower end of the head portion 32 of the connection pin 28, when the longitudinal direction thereof becomes parallel with the left-right direction of the vehicle. In this case, the retaining piece 42 is provided below the head portion 32 and between the stopper 20 and the inner wall 16A, and formed integrally with the stopper 20 and the inner wall 16A.

The connection pin 28 is disposed at the above-described leg piece 16. The connection pin 28 serving as a connection member includes the bar-like stem 30, and the head portion 32, which projects outwardly in the radial direction from one end of the stem 30 and is formed integrally with the stem 30 in a plate-like shape.

The stem 30, except the leading end thereof (i.e., the end portion opposite the head portion 32), is adapted to have a diameter corresponding to the above-described connection pin insertion hole 36A of the shaft 36. The diameter of the stem 30 is formed to be slightly smaller than that of the connection pin insertion hole 36A. The stem 30 is inserted through an insertion hole 16B formed in the inner wall 16A of the leg piece 16, and is supported by the inner wall 16A so as to be freely rotatable. The leading end of the stem 30 is tapered so that the diameter of the stem is reduced continuously toward the leading end. The stem 30 is disposed such that the axis thereof is parallel with the front-rear (longitudinal) direction of the vehicle. Accordingly, in the state in which the stem 30 is also inserted rotatably into the connection pin insertion hole 36A of the shaft 36, the leading end of the stem 30 is inserted into the bearing hole 14A formed at the side, of the leg piece 14, opposing the inner wall 16A (the vehicle rear side), and is supported therein so as to freely rotate. As a result, the shift lever assembly 12 disposed in the shift lever apparatus 10 is supported by the connection pin 28 so as to be pivotable in the vehicle left-right direction along the axis of the shaft 36. Therefore, since the shaft 36 is rotatable about the axis thereof, the shift lever assembly can pivot in the front-rear direction and the left-right direction of the vehicle.

The thickness direction of the head portion 32 is parallel with the direction of the axis of the stem 30 (i.e., the front-rear direction of the vehicle). Viewed from the thickness direction of the head portion 32 (i.e., from the front-rear direction of the vehicle), the head portion 32 is formed in a substantially rectangular shape. Each of the ends of the rectangle in the longitudinal direction is formed so as to slightly project outwardly (e.g., has a curved surface). Viewed from the front-rear direction of the vehicle, the center of the head portion 32 is positioned coaxially with the stem 30, and in the present embodiment, a wrench-fitting hole 34 having a shape of a hexagon, which corresponds to the leading end of a hexagonal wrench, is formed at the outer end of the head portion 32 (namely, the end opposite the stem 30, i.e., the vehicle rear side of the head portion 32) at the center position thereof (i.e., the position of the stem axis).

In addition, in the state in which the stem 30 is supported by the bearing hole 14A formed in the leg piece 14 and the insertion hole 16B formed in the leg piece 16, the head portion 32 is adapted to be rotatable within the space formed by the inner wall 16A, stoppers 20,22, and the retaining piece 24.

When the longitudinal direction of the head portion 32 is parallel with the left-right direction of the vehicle, each of the ends of the head portion 32 in the longitudinal direction thereof is configured to be located in the respective spaces between the stopper 20 and the inner wall 16A, and the stopper 22 and the inner wall 16A.

Figure 6:
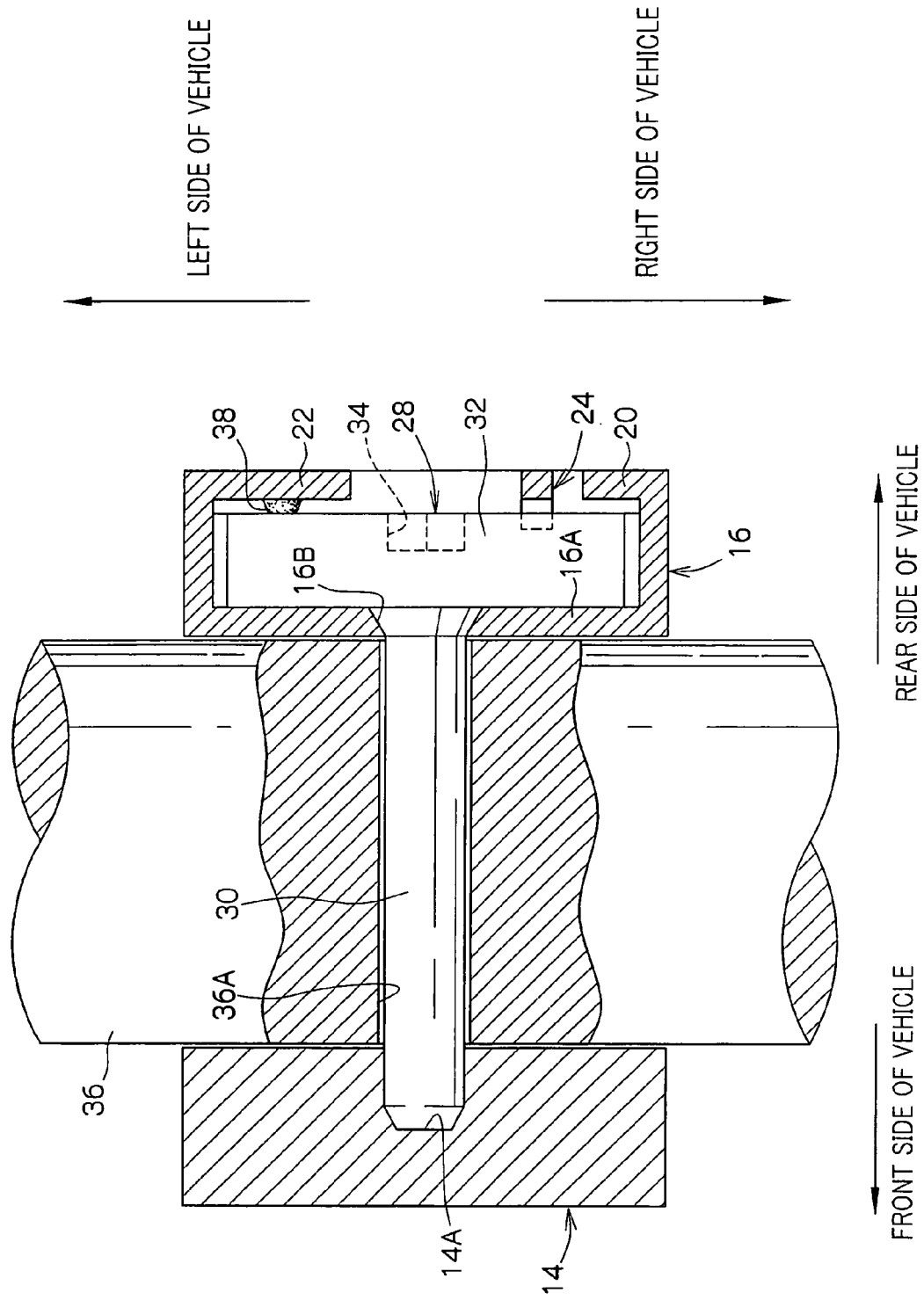
FIG. 6 is a cross-sectional view showing the shift lever assembly of FIG. 1 from a bottom side thereof, in which the head portion of the connection pin is in a regularly assembled state.

In the state described above, the depressing rib 38 is configured to press, with a relatively light force, the outer end of one longitudinal end of the head portion 32 (namely, the end portion opposite to the stem 30, i.e., the vehicle rear side of the head portion 32) from the side of the stopper 22 (i.e. the vehicle rear side) (see FIG. 6).

Next, operation of the present embodiment of the invention will be described.

When the lower end of the shift lever assembly 12 provided at the shift lever apparatus 10 is being assembled with the shaft 36, first, the shaft 36 is inserted and is placed into the space between the leg piece 14 and the leg piece 16 of the shift lever assembly 12, and the insertion hole 16B of the leg piece 16 and the bearing hole 14A of the leg piece 14 are positioned and aligned in relation to the axis position of the connection pin insertion hole 36A of the shaft 36 (i.e., the assembling position of the lower end of the shift lever assembly 12 with respect to the shaft 36). Next, in a state in which the longitudinal direction of the head portion 32 of the connection pin 28 is set along the vertical direction, the stem 30 of the connection pin 28 is inserted, from the vehicle rear side along the axis thereof, into the insertion hole 16B of the leg piece 16 and the connection pin insertion hole 36A of the shaft 36. Further, by inserting the leading end of the stem 30 into the bearing hole 14A of the leg piece 14, the connection pin 28 is fixed temporarily. As a result, the lower end of the shift lever assembly 12 (i.e., the leg pieces 14 and 16 of the shift lever assembly 12) is supported by the connection pin 28 (see FIGS. 2 to 5). In this way, the lower end of the shift lever assembly 12 (i.e., the leg pieces 14 and 16 of the shift lever assembly 12) are temporarily fixed to the shaft 36 by the connection pin 28.

Subsequently, the leading end of a hexagonal wrench is inserted into the wrench-fitting hole 34, which is formed in the head portion 32 of the connection pin 28, from the vehicle rear side. When the hexagonal wrench is turned in the clockwise direction seen from the vehicle rear side, the connection pin 28 (more specifically, the head portion 32 of the connection pin 28) is rotated about the axis of the stem 30 in the clockwise direction (hereinafter, such rotation will be merely called clockwise rotation) from the temporarily assembled state described above (see FIGS. 1 to 3, and FIG. 6).

In this case, the upper end of the ends in the longitudinal direction of the head portion 32 of the connection pin 28 enters into the space between the retaining piece 24 and the inner wall 16A, abuts the guide surface 24A of the retaining piece 24, and presses the retaining piece 24 toward the side opposite from the inner wall 16A (i.e., toward the rear side of the vehicle) while sliding over the guide surface 24A (see FIG. 3). Since the retaining piece 24 is formed of resin having a slight elasticity, the head portion 32 of the connection pin 28 pushes the retaining piece 24 toward the vehicle rear side with the upper end of the retaining portion 24 being a fixed end, along with the above-described rotation. Accordingly, the retaining piece 24 does not obstruct the clockwise rotation of the head portion 32 of the connection pin 28.

In this way, as the head portion 32 of the connection pin 28 is rotated in the clockewise direction and a rotation angle reaches 90°, the guide surface 24A of the retaining piece 24 no longer abuts the head portion 32. Thus, the retaining piece 24 is no longer pressed toward the rear side of the vehicle. Accordingly, due to the elastic action of the retaining piece itself, the retaining piece 24 returns to the previous position (i.e., natural position) where the retaining piece 24 was before being pressed by the head portion 32 (the regularly assembled state of the head portion 32 of the connection pin 28).

After the retaining piece 24 returns to the previous position before being pressed by the head portion 32, even if the head portion 32 tends to rotate in reverse toward the above-described temporarily assembled state position from this position (the position in the regularly assembled state), i.e., to rotate counter clockwise about the axis of the stem 30 seen from the vehicle rear side, and tends to return to the temporarily assembled state position from the aforementioned regularly assembled state position, the reverse rotation of the head portion 32 of the connection pin 28 is prevented since the lower end of the abutment portion 24B of the retaining piece 24 abuts the head portion 32 of the connection pin 28 from above. Hence, once the connection pin 28 is assembled to the lower end of the shift lever assembly 12 (i.e. the leg pieces 14 and 16 of the shift lever assembly 12), the head portion 32 of the connection pin 28 cannot return to the temporarily assembled state position inadvertently.

Meanwhile, when the head portion 32 is rotated in the clockwise direction by 90° from the temporarily assembled state position, the other end of the head portion 32 in the longitudinal direction, i.e., the end in the longitudinal direction which is positioned in the lower position when the connection pin 28 is in the temporarily assembled state, abuts the retaining piece 42, whereby the clockwise rotation of the head portion 32 is restricted.

Accordingly, the head portion 32 is prevented from rotating either in the clockwise direction or the counter clockwise direction by the retaining piece 24 and the retaining piece 42.

As such, in the regularly assembled state, which is established by rotating the head portion 32 in the clockwise direction by 90° from the position in the temporarily assembled state, the longitudinal direction of the head portion 32 becomes parallel with the left-right direction of the vehicle, and the ends in the longitudinal direction of the head portion 32 are positioned in the spaces between the inner wall 16A and the stopper 20, and between the inner wall 16A and the stopper 22, respectively. Accordingly, the head portion 32 of the connection pin 28 is restricted from moving along the direction of the axis of the stem 30 (i.e., in the front-rear direction of the vehicle) by the stoppers 20 and 22. Hence, the connection pin 28 can be prevented from falling out from the shift lever assembly 12 (more specifically, from the leg pieces 14 and 16 of the shift lever assembly 12).

In addition, as the head portion 32 of the connection pin 28 is being rotated from the above-described temporarily assembled state to the regularly assembled state as described above, the top portion of the depressing rib 38 (the portion including the apex of the conical shape), which projects from the stopper 22 toward the front side of the vehicle, is depressed by the other end of the ends in the longitudinal direction of the head portion 32 of the connection pin 28. As a result, the depressing rib 38 abuts the outer end of the head portion 32 of the connection pin 28 from the vehicle rear side with a relatively light force due to the elastic action of the depressing rib itself so that the head portion 32 of the connection pin 28 is pressed against the inner wall 16A of the leg piece 16 (see FIG. 6). As long as the depressing rib 38 continues to be depressed, the above mentioned abutting state is maintained, and the connection pin 28 is prevented from moving in the axis direction thereof. Hence, in the state in which the shaft 36 and the lower end of the shift lever assembly 12 (leg pieces 14 and 16 of the shift lever assembly) are assembled, rattling of the connection pin 28 in the axial direction is eliminated.

Further, the depressing rib 38 can also suppress the rattling around the axis of the connection pin 28 by cooperating with the above-described retaining piece 24, due to the frictional force generated between the head portion 32 of the connection pin 28 and the depressing rib 38.

As described above, in the shift lever apparatus 10, the stoppers 20 and 22 are integrally formed with the leg piece 16 of the shift lever assembly 12. Therefore, the connection pin 28 can be prevented from falling out from the shift lever assembly 12 (more specifically, out of the leg pieces 14, 16 of the shift lever assembly 12) and the shaft 36 without any additional members that restrict the connection pin 28 from moving in the axis direction thereof being provided. Hence, the number of components that are used for assembling the shift lever assembly 12 to the shaft 36 can be suppressed.

Furthermore, in the shift lever apparatus 10, in order to assemble the lower end (i.e., leg pieces 14, 16) of the shift assembly 12 to the shaft 36, it is sufficient to merely insert the stem 30 of the connection pin 28 into the connection pin insertion hole 36A of the shaft 36, the insertion hole 16B of the leg piece 16, and the bearing hole 14A of the leg piece 14, and to rotate the head portion 32 from the temporarily assembled state to the regularly assembled state. Hence, the shift lever assembly 12 can be readily assembled to the shaft 36.

Moreover, as described above, the retaining piece 24 is formed integrally with the leg piece 16 of the shift lever assembly 12. Therefore, the connection pin 28 can be not only restricted from making a counter clockwise rotation about the axis of the connection pin 28, but also prevented from returning to the temporarily assembled state and falling out, without providing any additional members for restricting the connection pin 28 from making a counter clockwise rotation about the axis thereof. Hence, the number of components that are used for assembling the shift lever assembly 12 to the shaft 36 can be further suppressed.

Further, as described above, the depressing rib 38 is formed integrally with the stopper 22 of the leg piece 16 of the shift lever assembly 12. This enables the connection pin 28 to be prevented from rattling without any additional members for preventing the rattling of the connection pin 28. Hence, the number of components that are used for assembling the shift lever assembly 12 to the shaft 36 can be more suppressed.

Note that, in the embodiment described above, each end in the longitudinal direction of the head portion 32 of the connection pin 28 is adapted to be retained so as not to fall out. However, only one end in the longitudinal direction may be adapted to be retained so as not to fall out. Even if only one end in the longitudinal direction of the head portion 32 is adapted to be retained so as not to fall out, the operations and the effects of the embodiment described above can be obtained. In addition, the wrench-fitting hole 34 of the head portion 32 of the connection pin 28 according to the embodiment of the invention is in the shape of a hexagon. However, it should be understood that the shape of the wrench-fitting hole 34 is not limited to a hexagon, and that any other shape such as a cross, a rectangle, a star, or others may be applied.

A described above, the shift lever apparatus according to the embodiment of the present invention can suppress the number of the components thereof and can be readily assembled to the shaft.

What is claimed is:

1. A shift lever apparatus including a shift lever assembly, the shift lever assembly being supported by a shaft that is disposed along the transverse direction of a vehicle, the lever assembly being operable in the longitudinal direction of the vehicle and the transverse direction of the vehicle, the shift lever apparatus comprising:

a connection pin which is temporarily assembled when inserted along an axis thereof from one end of the shift lever assembly and the shaft into the lever assembly and the shaft, the connection pin becoming regularly assembled when rotated about the axis thereof from the temporarily assembled state, and which supports the lever assembly to be pivotable on the shaft in the transverse direction of the vehicle;

a fallout-preventing mechanism which is provided on the lever assembly to be engageable with the connection pin, and which prevents the connection pin from falling out from the lever assembly and the shaft by engaging the connection pin while the connection pin is in the regularly assembled state, wherein the fallout-preventing mechanism is formed integrally with the lever assembly, and serves as a stopper for preventing the connection pin from falling out by abutting the head portion of the connection pin when the connection pin is rotated a pre-selected angle into the regularly assembled state, and a rattling-preventing member, which is formed integrally with and projects from the shift lever assembly for contacting with the connection pin when in the regularly assembled state, and which serves to prevent the connection pin from moving in the axial direction thereof in the regularly assembled state, wherein at least a portion of the rattling-preventing member which abuts the connection pin is formed of an elastic member.

2. The shift lever apparatus according to claim 1, wherein the connection pin comprises a stem which is formed in the shape of a bar and inserted into both the shaft and the lever assembly and a head portion which projects radially outward from one end of the stem and is formed integrally with the stem.

3. A shift lever apparatus including a shift lever assembly, the shift lever assembly being supported by a shaft that is disposed along the transverse direction of a vehicle, the lever assembly being operable in the longitudinal direction of the vehicle and the transverse direction of the vehicle, the shift lever apparatus comprising:
  a connection pin which is temporarily assembled when inserted along an axis thereof from one end of the shift lever assembly and the shaft into the lever assembly and the shaft, the connection pin becoming regularly assembled when rotated about the axis thereof from the temporarily assembled state, and which supports the lever assembly to be pivotable on the shaft in the transverse direction of the vehicle; and
  a fallout-preventing mechanism which is provided on the lever assembly to be engageable with the connection pin, and which prevents the connection pin from falling out from the lever assembly and the shaft by engaging the connection pin while the connection pin is in the regularly assembled state, and which includes a reverse-rotation preventing member, which is formed integrally with the lever assembly in a path of rotation taken by the connection pin from the temporarily assembled state to the regularly assembled state, and serves to prevent the connection pin from rotating in reverse from the regularly assembled state to the temporarily assembled state by abutting the connection pin when in the regularly assembled state.

4. The shift lever apparatus according to claim 3, comprising a plurality of the reverse-rotation preventing members.

5. The shift lever apparatus according to claim 4, wherein each of the plurality of reverse-rotation preventing members comprises an end, the ends being provided in parallel relation to each other.

6. The shift lever apparatus according to claim 4, wherein at least one of the plurality of reverse-rotation preventing members is a cantilever type formed integrally with the shift lever assembly.

7. A shift lever apparatus being mounted on a vehicle and including a shift lever assembly, the shift lever assembly being supported by a shaft that is disposed along the transverse direction of the vehicle, the lever assembly being operable in the longitudinal direction and the transverse direction of the vehicle, the shift lever apparatus comprising:
  two leg pieces being spaced apart and opposite to each other, one of the leg pieces having a bearing hole and the other of the leg pieces having an insertion hole;
  a connection member including a stem and a head having longitudinal side surfaces and transverse side surfaces, which connects the shift lever assembly with the shaft when the stem is passed through the insertion hole and into the bearing hole of the leg pieces;
  a fallout-preventing mechanism provided opposite to the other of the leg pieces, which prevents the connection member from moving in the axial direction thereof;
  a first retaining piece, one end of which being fixed in a cantilever configuration on the other one of the leg pieces and disposed along the vertical direction of the vehicle; and
  a second retaining piece which is spaced apart from the first retaining piece and provided integrally with the other one of the leg pieces;
  wherein the connection member is put into a regularly assembled state when rotated about the axis of the stem in one direction, thereby being removed from the temporarily assembled state where the connection member is inserted from the insertion hole via the shaft up to the bearing hole, the shift lever assembly being supported by the shaft to be rotatable in the transverse direction of the vehicle.

8. The shift lever apparatus according to claim 7, wherein the other of the leg pieces and the fallout-preventing mechanism are provided spaced apart from each other to define a space, and the head portion of the connection member is disposed within the space.

9. The shift lever apparatus according to claim 7, wherein a free end of the first retaining piece is arranged to engage the head of the connection member when in the regularly assembled state, the engagement preventing the connection member from rotating about the axis in another direction.

10. The shift lever apparatus according to claim 7, wherein the first retaining piece and the second retaining piece are arranged in such a manner that a free end of the first retaining piece and an end of the second retaining piece are parallel with each other.

11. The shift lever apparatus according to claim 7, wherein the first retaining piece is disposed in the path of the connection member to abut therewith when the connection member is rotated from the temporarily assembled state to the regularly assembled state, and has elasticity to allow movement in the longitudinal direction of the vehicle when abutting.

12. The shift lever apparatus according to claim 7, wherein the side surface of the head is formed in a curved shape.

13. The shift lever apparatus according to claim 7, wherein the second retaining piece is disposed in a position where the second retaining piece can abut the connection member to prevent the connection member from rotating further in the one direction and out of the regularly assembled state.

14. The shift lever apparatus according to claim 7, further comprising an engaging projection, the engaging projection being attached to the fallout-preventing mechanism.

15. The shift lever apparatus according to claim 14, wherein the engaging projection is disposed in a position where the engaging projection engages the head portion when the connection member is in the regularly assembled state so that the engaging projection controls movement of the connection member in the axial direction thereof.

16. The shift lever apparatus according to claim 15, wherein at least a portion of the engaging projection, which engages the head portion, is formed of an elastic material.

* * * * *